Nov. 22, 1966  P. R. FERNÁNDEZ  3,287,008
SHOCK ABSORBERS
Filed Dec. 2, 1964  2 Sheets-Sheet 1
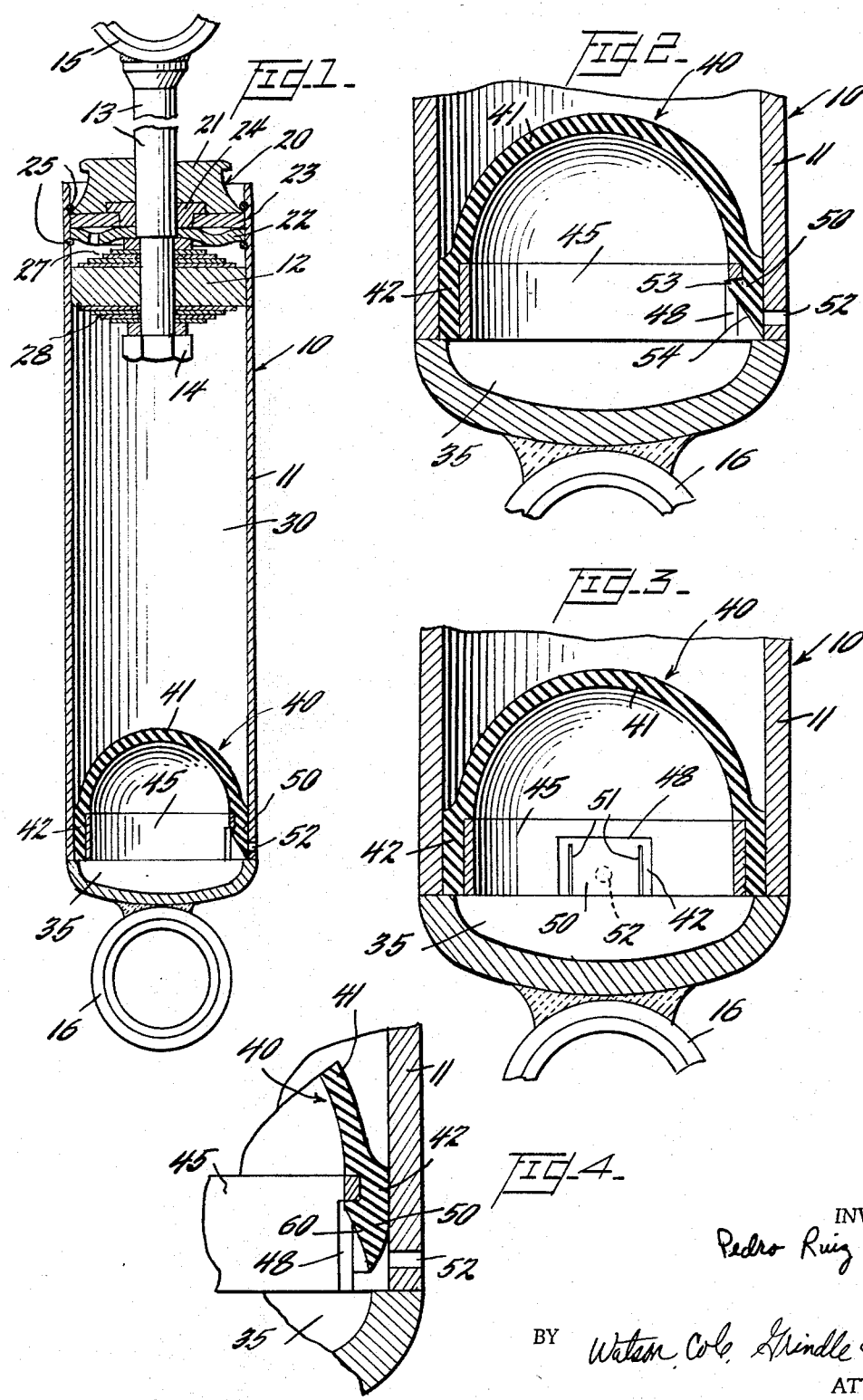
INVENTOR
Pedro Ruiz Fernandez
BY Watson, Cole, Grindle & Watson
ATTORNEYS

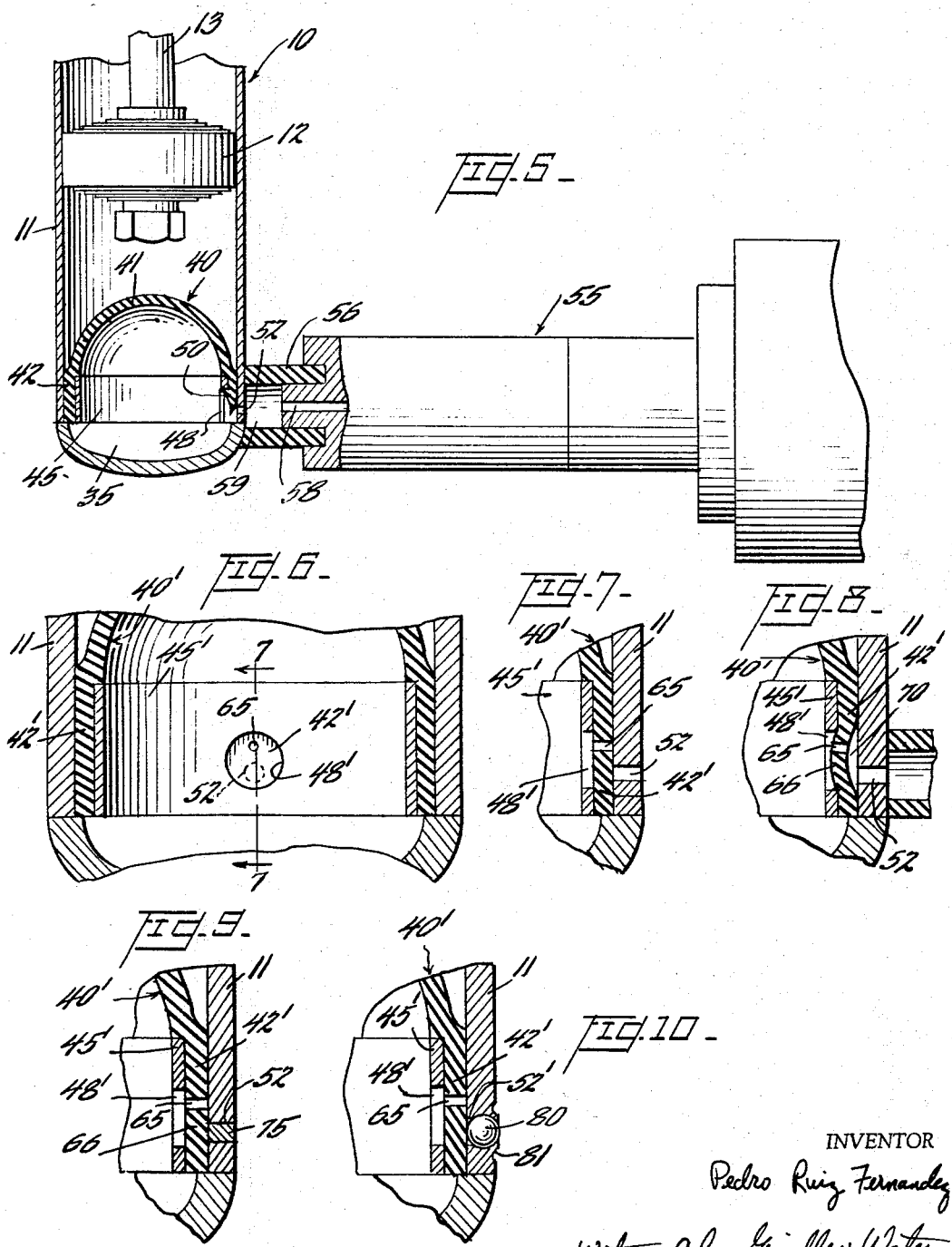

United States Patent Office 3,287,008
Patented Nov. 22, 1966

3,287,008
SHOCK ABSORBERS
Pedro Ruiz Fernández, Barcelona, Spain, assignor to Christian Marie Lucien Louis Bourcier de Carbon, Neuilly-sur-Seine, France
Filed Dec. 2, 1964, Ser. No. 415,322
Claims priority, application Spain, Jan. 23, 1964, 295,641
10 Claims. (Cl. 267—64)

This invention relates to shock absorbers and more particularly to the construction and pressurizing of shock absorbers of the hydro-pneumatic type.

The general object of the invention is the provision of a novel and improved shock absorber of the class described wherein the introduction of gas under pressure into the compensation chamber thereof is facilitated.

It is already known to provide shock absorbers of the piston and cylinder type with such compensation chambers containing a gas under pressure designed to compensate for the displacement of damping liquid by the entrance into the shock absorber cylinder of successive portions of the piston rod on the compression stroke, the gas being separated from the liquid by means of a partition, comprising either a floating piston as in the United States Patent No. 2,774,446, or a flexible diaphragm as in the case of United States application Serial No. 166,145, filed January 15, 1962, and allowed May 20, 1964, both in the name of De Carbon.

The injection of gas under pressure into such compensation chambers presents certain problems difficult to solve. Various solutions have been proposed such as for example injecting the gas and blocking the hole in the cylinder wall through which the gas has passed by welding by means of a fluidtight electrode installation.

However, this solution and others that have been tried are difficult and costly to carry out, and for this reason, the present invention has been conceived and put into practice.

The invention in its preferred embodiments contemplates the provision of means within the compensation chamber portion of the shock absorber casing which embodies flexible and resilient flap valve means cooperating with a small orifice in the cylinder wall, and designed to yield upon the application of gas pressure from the outside, and to close immediately upon cessation of such pressure due to the elasticity and flexibity of the flap or elastic and resilient portion and the pressure of the gas which has been injected into the chamber.

Practically, the flap or flexing element is comprised in a ring device fixedly mounted within the cylinder of the shock absorber and which has an elastic zone capable of flexing with respect to the principal portion of the ring and in overlapping relationship to the inward orifice of the small passageway through which the gas is injected.

Several embodiments employing the principles of the invention are illustrated as examples herein, and optionally further means may be applied to the opening through the cylinder wall to effect permanent sealing closure thereof.

Other objects and features of novelty will be apparent from the following specification when read in connection with the accompanying drawings in which certain embodiments of the invention are illustrated by way of example.

In the drawings:

FIGURE 1 is a view in vertical diametric section of a shock absorber embodying the principles of the invention;

FIGURE 2 is an enlarged similar sectional view of the lower portion of the shock absorber shown in FIGURE 1;

FIGURE 3 is a vertical diametric section through the same portion, but at right angles to the section taken in FIGURE 2;

FIGURE 4 is a further enlarged fragmentary view of the sealing flap arrangement of this portion of the invention and corresponding to the right-hand portion of FIGURE 2, but showing the device in the condition it occupies during the application of pressure to the cylinder;

FIGURE 5 is a fragmentary view in somewhat diagrammatic style showing how a pressure applying pump or ram can be applied to the orifice in injecting gas into the compensation chamber;

FIGURE 6 is a fragmentary view in transverse vertical section of the gas injection portion of the shock absorber which comprises a modified form of the invention;

FIGURE 7 is a fragmentary sectional view taken on line 7—7 of FIGURE 6 and showing the condition of the arrangement either when completely emptied of pressure gas or when the compensation chamber is fully inflated;

FIGURE 8 is a similar view showing the condition of the valving or sealing portions during the application of pressure gas;

FIGURE 9 is a similar view showing a plug welded into the opening through the cylinder; and FIGURE 10 is a similar sectional view showing the use of a steel ball swaged into the opening as a sealing device.

In FIGURE 1 of the drawings there is illustrated a direct acting piston and cylinder hydro-pneumatic shock absorber particularly adaptable for use in connection with wheel suspensions of motor vehicles the shock absorber generally designated 10 and comprising a cylinder 11 and a piston 12, the piston having a piston rod 13 rigid therewith and secured in the usual manner as by means of the nut 14. The protruding end of the piston rod 13 may be provided with an attaching ring shown fragmentarily at 15 and the lower end of the cylinder 11 is provided with a similar ring 16 for attachment to one of the members the relative movement of which is to be damped.

At 20 there is shown a typical end closure for the cylinder which provides a seal for the piston rod 13. The exact nature of this seal does not comprise a part of the present invention and, therefore, it will be only briefly described as comprising a rigid outer member 21, an inner perforated member 22, and a radially and axially compressed intermediate washer member 23 which exerts pressure on the plug 24 which closely embraces the rod 13. The entire sandwich assembly may be secured within the cylinder and by means of the circlips or split rings 25.

The piston may be of any suitable type, and provided with compression and expansion passageways therethrough (not shown) controlled respectively by the disc valving 27 and 28. The working chamber 30 of the cylinder 11 is completely filled with damping liquid, for example an oil of suitable properties. The extreme lower end of the cylinder 11 comprises a compensation chamber 35 which is filled with gas under pressure, the gas being separated from the body of damping liquid in the chamber 30 by means of the elastic flexible membrane or diaphragm 40.

The diaphragm installation 40 comprises a bulbous member 41 having a substantially cylindrical neck portion 42 which is pressed securely against the inner walls of the cylinder 11 by means of the relatively rigid ring or annulus 45, this ring being made of metal, plastic or other suitable stiff material.

As most clearly shown in FIGURES 2, 3 and 4 of the drawings the ring 45 is cut away at one point around its periphery to provide a window or opening 48 through which an inner portion of the collar or neck 42 of the diaphragm 40 is visible. However, the greater part of the portion of the neck 42 of the diaphragm as viewed through the window 48 comprises a flap 50 created by the slitting of the material of which the neck 42 is made as at 51. A rather small opening 50 is formed in the wall of the cylinder 11 within the area of the window 48 and adapted to be normally sealed by means of the flap portion 50 of the neck of the diaphragm. This portion 50 may, if desired, protrude inwardly of the window 48 at the top as at 53 and is preferably tapered or attenuated in thickness downwardly as indicated at 54.

In pressurizing the compensation chamber of the shock absorber, any suitable means for injecting compressed gas through the opening 52 in the wall of the cylinder 11 may be employed such as the ram indicated diagrammatically at 55 in FIGURE 5, the ram being provided with a flexible nozzle portion 56 which has an end configuration conforming to that of the cylinder wall 11 and is adapted to surround the opening 52 in that wall. Compressed air then may issue from the duct 58 into the ante-chamber 59 provided by the nozzle 56.

During injection of the gas the flexible flap or valve portion 50 of the neck of the diaphragm flexes inwardly and assumes a curvature similar to that indicated at 60 in FIGURES 4 and 5.

When the compensation chamber 35 is under the desired pressure, the application of compressed gas is discontinued and, due to the elastic recovery of the material of the flap 50 and the pressure of the contained gas, the flap is pressed firmly against the inner orifice of the opening 52 and effectively seals the opening against the escape of gas.

Another embodiment of the invention is illustrated in FIGURES 6, 7, 8 and 9 of the drawings. In this embodiment the diaphragm 40' is provided with a modified form of neck structure 42' fitted within the cylinder 11 and the rigid annulus 45' is of a different construction.

The annulus 45' is provided with an opening or window 48' through which an inner portion of the neck 42' of the diaphragm is exposed. The opening through the cylinder wall 11 is again designated 52 and registers with the confines of the window 48'. Also displaced from registry with the opening 52 is a small opening 65 which is formed in the exposed portion of the neck 42' of the diaphragm.

Upon the application of gas as by means of the ram 55 such as shown in FIGURE 5, the parts assume the position indicated in FIGURE 8 of the drawings. It will be seen that under the influence of the pressure of the incoming gas the portion of the neck 42' of the diaphragm which registers with the window 48' of the ring 45' is bulged inwardly as clearly shown at 66 whereby a small lenticular pocket 70 is formed through which the gas may pass from the opening 52 in the wall of the cylinder 11 and then through the opening 65 in the neck 42' of the diaphragm.

Now upon release of the pressure of the gas, the bulged portion 66 collapses, the exposed portion of the neck 42' returning to contact with the inner wall of the cylinder due to the elastic recovery of the material of the portion 66 and the internal pressure of the gas, all as clearly shown in FIGURE 9 of the drawings.

In either of these embodiments the opening 52 may be further sealed by means of a plug 75 which is preferably welded into place within the opening, but which may be threaded and screwed into the correspondingly threaded opening.

A variation in the embodiment illustrated in FIGURES 6, 7, 8 and 9 is suggested in FIGURE 10 of the drawings. In this case instead of using a welded or threaded plug 75, a spherical plug or ball 80 is forced into the opening 52' causing the material of the wall of the cylinder 11 to flow outwardly, since the ball is somewhat larger than the diameter of the opening. After the ball is in place as shown in FIGURE 10 the outward material surrounding the distorted opening may be swaged radially inwardly around the ball 80 as clearly indicated at 81 in FIGURE 10.

Within the broader aspects of the invention, the neck 42 or 42' of the diaphragm together with the stiff ring or annulus 45 or 45' may be considered as a unitary entity and may be used as a filling and sealing expedient per se, and the partition proper may then comprise a separate entity as the floating partition of the De Carbon Patent No. 2,774,446, the fixed diaphragm of the De Carbon application Serial No. 166,145 now Patent No. 3,140,085, or the floating diaphragm of the De Carbon application Serial No. 392,218, filed August 26, 1964.

It is understood that various changes and modifications may be made in the embodiments illustrated and described herein without departing from the scope of the invention as determined by the sub-joined claims.

Having thus described the invention, what is claimed as new and desired to be secured by Letters Patent is:

1. A hydro-pneumatic shock absorber having a fluid casing divided into a work chamber adapted to be filled with damping liquid and a compensation chamber adapted to be filled with gas under pressure, a partition separating said chambers and capable of yielding at least in part during operation of the shock absorber, filling and sealing means for said compensation chamber comprising an opening through the wall of said casing, an annular sleeve device mounted within said casing adjacent the opening in the wall thereof, an elastic zone in said sleeve device in general registry with said opening, said zone adapted to yield inwardly of the casing upon external application of gas pressure to the opening and uncover the inner orifice of the opening for the admission of gas, and to close against the inner wall of the casing and seal the orifice upon release of the external application of pressure to seal said opening, by virtue of its elastic recovery and of the pressure of the gas within the chamber.

2. The shock absorber as set forth in Claim 1 in which the elastic zone comprises a flap portion of the annular sleeve device separated from the body portion of the device on three sides.

3. The shock absorber as set forth in claim 1 in which said elastic zone comprises an area of the sleeve device entirely surrounded by inelastic portions of the body of the sleeve device, and an opening is provided through said zone in non-registry with the opening in the wall of the casing.

4. The shock absorber as set forth in claim 1 in which said annular sleeve device comprises a substantially rigid ring member and a surrounding flexible elastic ring member interposed between said first-named ring member and the wall of the chamber, and a window is formed in said first-named ring member, and that portion of the second-named ring member exposed within said window constitutes said elastic zone.

5. The shock absorber as set forth in claim 2 in which said annular sleeve device comprises a substantially rigid ring member and a surrounding flexible elastic ring member interposed between said first-named ring member and the wall of the chamber, and a window is formed in said first-named ring member, and said flap portion is formed in that portion of the second-named ring member exposed within said window.

6. The shock absorber as set forth in claim 3 in which said annular sleeve device comprises a substantially rigid ring member and a surrounding flexible elastic ring member interposed between said first-named ring member and the wall of the chamber; and a window is formed in said first-named ring member; and that portion of the second-named ring member exposed within said window constitutes said elastic zone.

7. The shock absorber as set forth in claim 1 in which said filling and sealing means comprises a marginal part of said partition, the portion of said partition extending across said casing being flexible to yield upon variations in relative fluid quantity during operation.

8. The shock absorber as set forth in claim 4 in which said surrounding ring member constitutes a marginal part of said partition, the remaining portion thereof extending across said casing and being flexible to yield upon variations in relative fluid quantities during operation.

9. The shock absorber as set forth in claim 1 in which said opening is further sealed by the welding therein of a metal plug.

10. The shock absorber as set forth in claim 1 in which said opening is further sealed by a spherical plug forced into said opening from outside the casing, the walls of the opening thus being distorted outwardly and the exterior margins of the opening being swayed inwardly around the outer portions of said spherical plug.

No references cited

ARTHUR L. LA POINT, *Primary Examiner.*

R. M. WOHLFARTH, *Assistant Examiner.*